US010480386B2

(12) United States Patent
Pedersen et al.

(10) Patent No.: US 10,480,386 B2
(45) Date of Patent: Nov. 19, 2019

(54) EXHAUST MANIFOLD FOR COMBINING SYSTEM EXHAUST PLUME

(71) Applicant: Bell Helicopter Textron Inc., Fort Worth, TX (US)

(72) Inventors: Keith C. Pedersen, Fort Worth, TX (US); Brent Scannell, Roxboro (CA); Nam Dai Tran, Arlington, TX (US); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 77 days.

(21) Appl. No.: 15/713,207

(22) Filed: Sep. 22, 2017

(65) Prior Publication Data

US 2019/0093541 A1    Mar. 28, 2019

(51) Int. Cl.

| F01N 13/10 | (2010.01) |
|---|---|
| B64C 27/00 | (2006.01) |
| B64D 33/08 | (2006.01) |
| F01P 1/06 | (2006.01) |
| F01P 11/10 | (2006.01) |

(52) U.S. Cl.
CPC ............. *F01N 13/10* (2013.01); *B64C 27/00* (2013.01); *B64D 33/08* (2013.01); *F01P 1/06* (2013.01); *F01P 11/10* (2013.01)

(58) Field of Classification Search
USPC .......... 60/272, 280, 305, 321, 322, 323, 324
See application file for complete search history.

(56) References Cited

U.S. PATENT DOCUMENTS

| 2,119,402 A | * | 5/1938 | Puffer | ................... | B64D 13/04 123/41.1 |
|---|---|---|---|---|---|
| 2,503,172 A | * | 4/1950 | Pullin Cyril | ............ | B64C 27/82 244/17.19 |

(Continued)

FOREIGN PATENT DOCUMENTS

| EP | 0013272 A1 | 7/1980 |
|---|---|---|
| EP | 2724934 A1 | 4/2014 |

(Continued)

OTHER PUBLICATIONS

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).

(Continued)

*Primary Examiner* — Binh Q Tran
(74) *Attorney, Agent, or Firm* — Patent Capital Group

(57) ABSTRACT

Disclosed herein is an aircraft that includes an exhaust manifold for combining one or more system exhaust paths located upstream of equipment inlets and directing the exhausts upwards towards the rotor linkages such that the exhaust is expelled and diffused forward of the equipment inlets. According to one aspect of the present disclosure, the exhaust manifold includes a structure for supporting a transmission cowling at the top of the aircraft and/or on the sides of the aircraft. For example, the exhaust manifold may include a platform that contains the exhaust ducts and may include a frame extending from the platform that follows the contours of the cowling, such that the cowling lays along the support frame for additional mechanical support.

15 Claims, 5 Drawing Sheets

(56) References Cited

U.S. PATENT DOCUMENTS

| | | | | |
|---|---|---|---|---|
| 3,792,827 | A | * | 2/1974 | Girard .................. B64C 27/026 244/7 A |
| 5,052,176 | A | * | 10/1991 | Labatut .................... F02K 3/10 60/225 |
| 7,147,182 | B1 | * | 12/2006 | Flanigan ............. B64C 29/0033 244/6 |
| 7,823,375 | B2 | * | 11/2010 | Zack ...................... B64D 33/04 60/269 |
| 8,141,912 | B2 | * | 3/2012 | Nyhus .................... B64C 3/385 285/223 |
| 2014/0060004 | A1 | | 3/2014 | Mast et al. |
| 2014/0096501 | A1 | | 4/2014 | Pantalone, III et al. |

FOREIGN PATENT DOCUMENTS

| | | |
|---|---|---|
| GB | 638093 A | 5/1950 |
| WO | 2016018498 A1 | 2/2016 |

OTHER PUBLICATIONS

Perry, Dominic, "Analysis: Bell 525 Relentless Cutaway and Technical Description", Flight Global, Flight International, Bell Helicopter, Published Nov. 12, 2014. (8 pages).
EPO Examination Report for EP Application No. 17203232.8 dated Jun. 7, 2018, 5 pages.
EPO Search Report for EP Application No. 17203232.8 dated May 16, 2018, 4 pages.

* cited by examiner

EXHAUST MANIFOLD FOR COMBINING SYSTEM EXHAUST PLUME

TECHNICAL FIELD

This disclosure relates generally to an exhaust system for an aircraft and more particularly, though not exclusively, to an exhaust manifold for combining aircraft system exhausts.

BACKGROUND

An aircraft generally includes an exhaust system for expelling hot exhaust gases in a safe and efficient manner. Exhaust gases may reach temperatures of greater than 450 degrees Fahrenheit and are likely to cause damage or disruption to objects that they may be directed to when expelled. For example, hot air around an aircraft tail boom or aircraft rotors may cause the structures to weaken and may affect performance. Further, exhaust systems are typically designed with plumbing to expel exhaust aft of equipment inlets, particularly the engine inlet, so that the exhaust is not re-ingested into the equipment.

SUMMARY

According to one aspect of the present disclosure, there is provided an aircraft that includes an exhaust manifold for combining one or more system exhaust paths located upstream of the equipment inlets and directing the exhausts upwards towards the rotor disc such that the exhaust is expelled and diffused forward of the engine inlets. The exhaust manifold may combine and expel system exhaust, for example, from an electric generator, an oil cooler, an environmental control system, and/or other equipment located upstream from the engine and other equipment inlets. The exhaust manifold may include exhaust ducts, air ducts, flexible hosing, and other plumbing to direct hot exhaust towards the aircraft rotor linkages, such that the exhaust is expelled forward of the engine and other equipment inlets, but not re-ingested into the engine or the other equipment.

According to one aspect of the present disclosure, the exhaust manifold includes a structure for supporting a transmission cowling at the top of the aircraft and/or on the sides of the aircraft. For example, the exhaust manifold may include a platform that contains exhaust ducts where the platform is shaped to provide mechanical support to the transmission cowling along the top of the aircraft. In another example, the exhaust manifold may include a frame extending from the underside of the platform that follows the contours of the transmission cowling such that, when the transmission cowling is in a closed position, the cowling lays along the support frame for additional mechanical support.

DETAILED DESCRIPTION

Figure 1A:
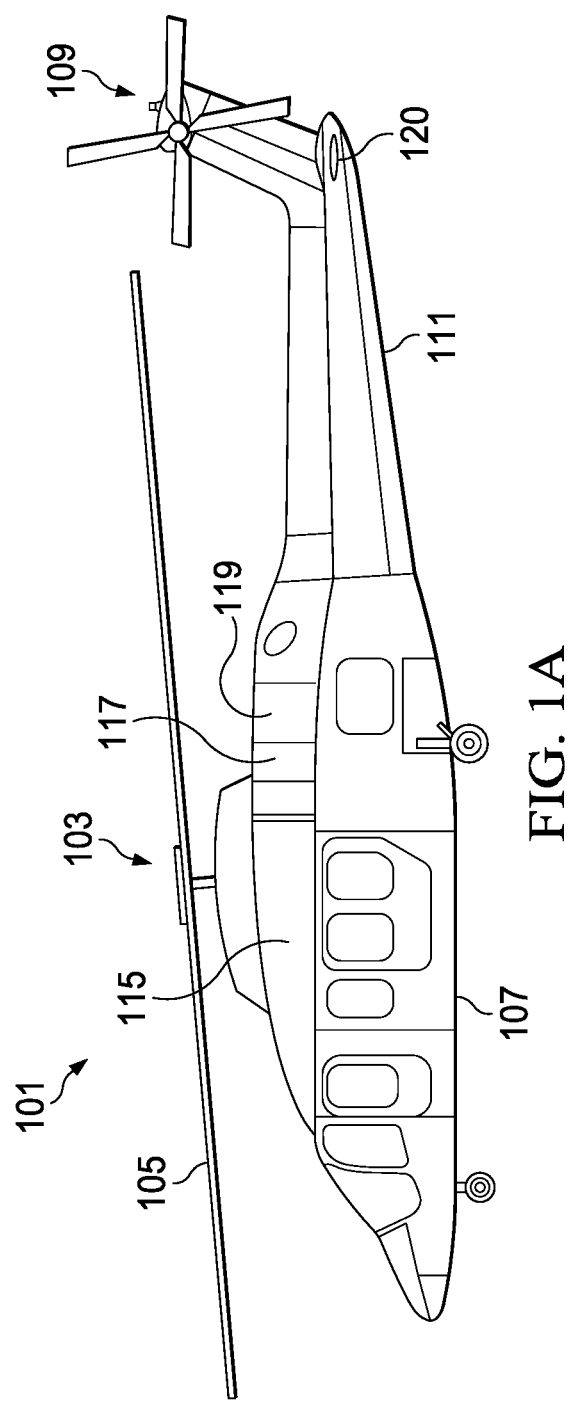
FIGS. 1A and 1B illustrate example aircraft in accordance with certain embodiments.

An aircraft may include an exhaust manifold for combining multiple system exhausts located upstream of the engine and other equipment inlets, and directing the exhausts upward towards a rotor disc to expel and diffuse the exhausts away from the aircraft. In some embodiments, the exhaust manifold may combine and expel system exhaust, for example, from an electric generator and an oil cooler. In some embodiments, the exhaust manifold may further combine and expel exhaust from an environmental control system, or other equipment located upstream from the engine and other equipment inlets. The manifold may include air ducts, flexible hosing, or other plumbing to direct hot exhaust towards the aircraft rotor linkages, so that the hot exhaust may dissipate away from the aircraft rotors and away from the engine inlets.

In some embodiments, the exhaust manifold may include structures for supporting a transmission cowling. In some embodiments, the exhaust manifold may include a platform that contains the air ducts where the platform is shaped to fit within the contours of the aircraft. The outside edges of the platform may attach and provide mechanical support to the transmission cowling along the top of the aircraft. In some embodiments, the exhaust manifold platform may include a frame or bracket extending from the bottom and/or sides of the platform that may attach to the floor or base of the transmission compartment and may match the contours of the transmission cowling along the sides of the aircraft. When the transmission cowling is in a closed position, the cowling lays along the support frame to provide additional reinforcement.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Like reference numbers and designations in the various drawings indicate like elements. Moreover, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIGS. 1-4 illustrate an exemplary rotorcraft having a vertical rotor on the top of the aircraft that includes an exhaust manifold for combining system exhausts for equipment located upstream of the engine inlets, and directing the exhaust towards the rotor linkages.

Figure 1B:
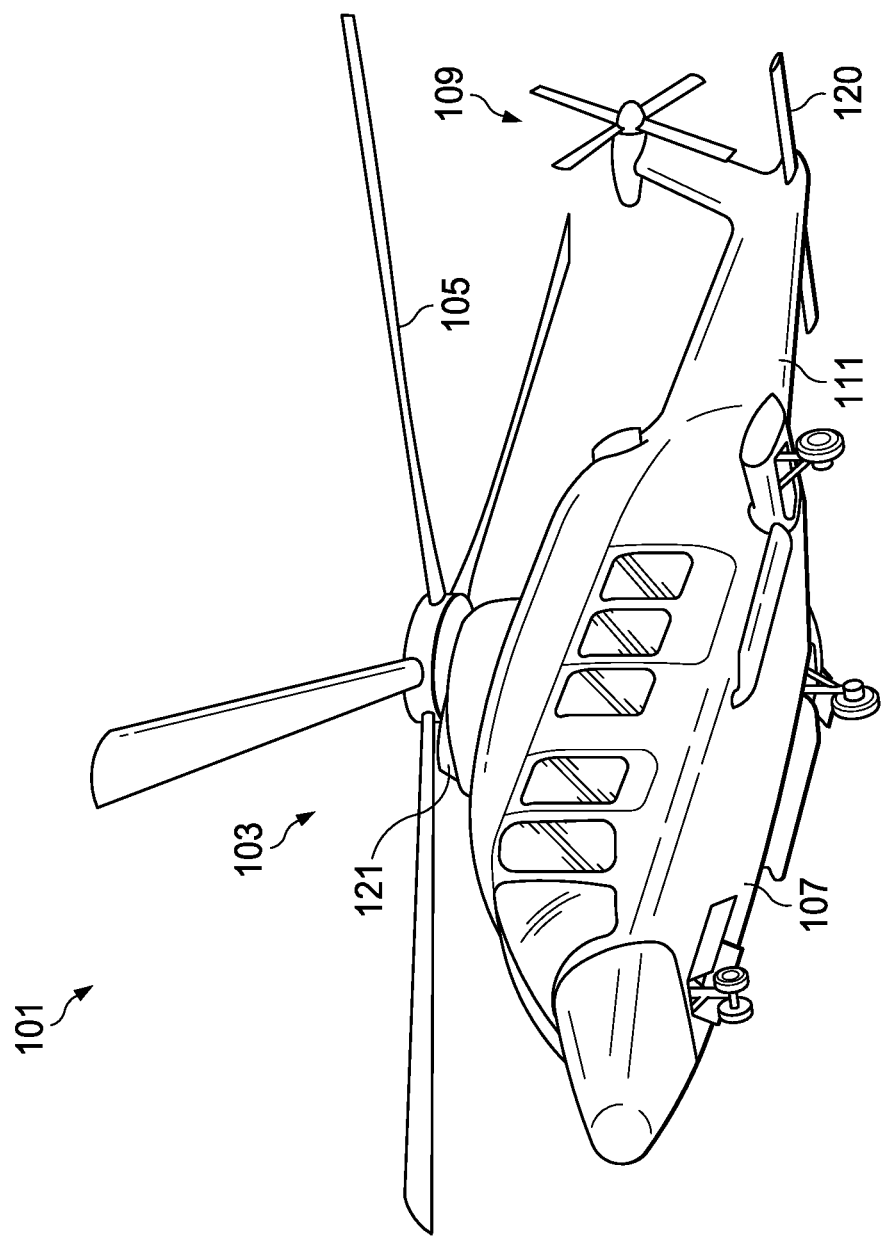

FIGS. 1A and 1B illustrate an example embodiment of a rotorcraft 101. FIG. 1A illustrates a side view of rotorcraft 101, while FIG. 1B illustrates a perspective view of rotorcraft 101. Rotorcraft 101 has a rotor system 103 with a plurality of rotor blades 105. The pitch of each rotor blade 105 may be managed or adjusted in order to selectively control direction, thrust, and lift of rotorcraft 101. Rotorcraft 101 further includes a fuselage 107, anti-torque system 109, an empennage 111, and a tail structure 120. In this example, tail structure 120 can represent a horizontal stabilizer. Torque is supplied to rotor system 103 and anti-torque system 109 using at least one engine. FIG. 1A also illustrates an engine cowling 119 for covering a rotorcraft and an engine inlet 117, which are located aft of the rotor linkages. FIG. 1A further illustrates a transmission cowling 115 for covering a rotorcraft transmission. As most rotorcrafts include two engines and two transmissions, a second engine inlet, a second engine cowling, and a second transmission cowling would be located on the opposite side of rotorcraft 101 (not shown). FIG. 1B further illustrates an exemplary location of an exhaust manifold structure 121 disclosed herein, in accordance with various embodiments. As depicted, the exhaust manifold 121 is located forward of engine inlet 117. As used herein, cowl, cowling, and fairing may be used interchangeably.

It should be appreciated that rotorcraft 101 of FIGS. 1A and 1B are merely illustrative of a variety of aircraft that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

The embodiments described throughout this disclosure provide numerous technical advantages, including providing full access to equipment for performing maintenance and service without having to remove the access door. Further, the bi-folding door enables a single maintenance worker to open and close the door while providing full access to the equipment.

Example embodiments that may be used to implement an exhaust manifold for combining and expelling multiple exhaust paths towards the rotor linkages, such that the exhaust dissipates upwards and away from the engine inlets, are described below with more particular reference to the remaining FIGURES.

Figure 2:
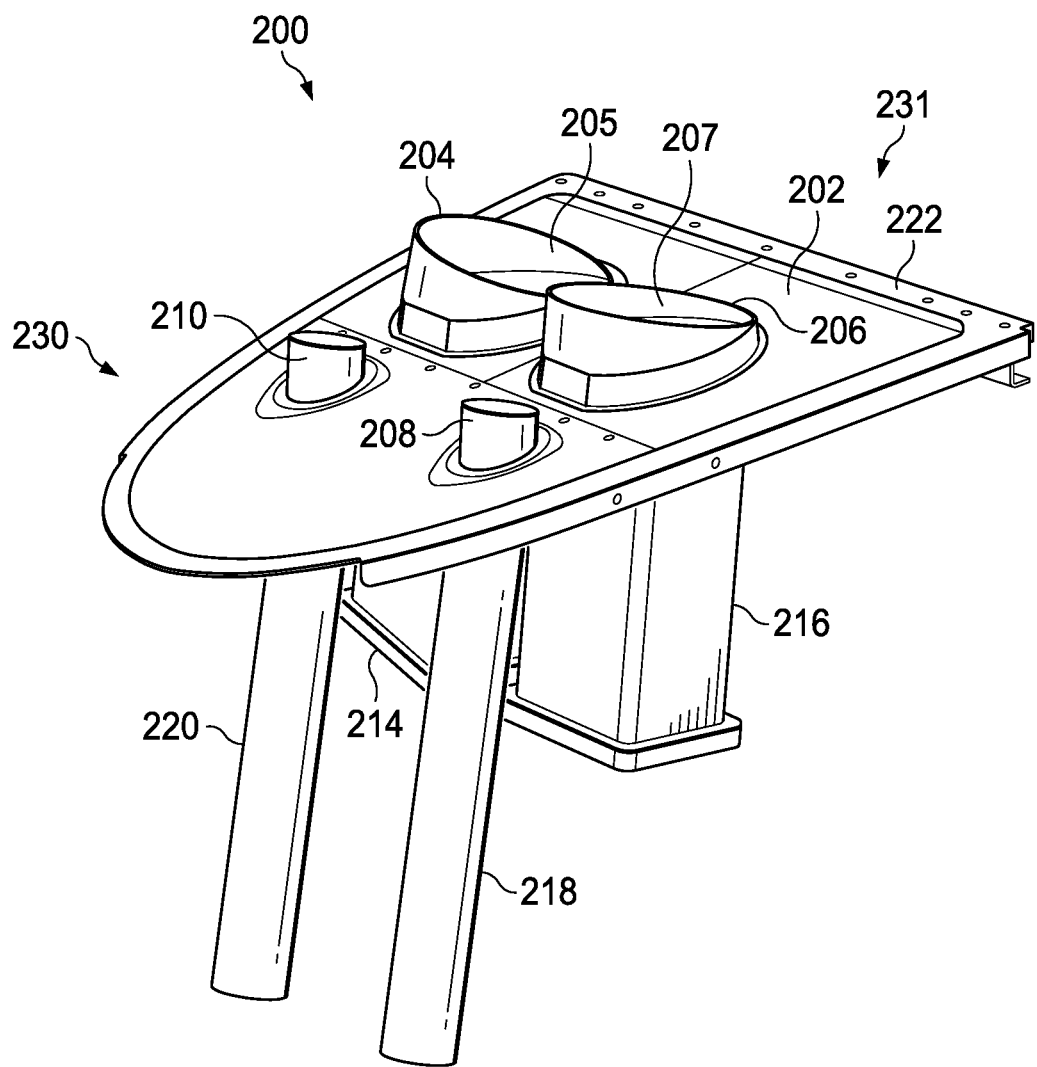
FIG. 2 illustrates an example exhaust manifold for combining system exhaust plume, in accordance with various embodiments.

FIG. 2 illustrates an exhaust manifold for combining exhaust paths, in accordance with various embodiments. As shown in FIG. 2, exhaust manifold 200 includes a platform 202 having multiple openings or exhaust ducts on the top side 204, 206, 208, 210 and corresponding air ducts 214, 216, 218, 220 on the bottom side. In some embodiments, the exhaust may be pulled through the ducts using any suitable means, such as a squirrel cage fan, an impeller, and/or a blower. For example, exhaust from a transmission oil cooler may be pulled through air ducts 214, 216 and exhaust ducts 204, 206, then, expelled towards the rotor linkages. In some embodiments, the exhaust may be pushed through the ducts using any suitable means, such as, by an impeller on the system that is creating the exhaust. For example, air ducts 218, 220 may be connected to a plenum in a generator with flexible hosing and an impeller located in the generator may push the exhaust air from the generator through the exhaust ducts 208, 210.

Platform 202 may be any suitable size and shape to fit within a top region of the rotorcraft and to provide sufficient area for containing and connecting multiple exhaust paths and directing them towards the rotor disc. As shown in FIG. 2, the platform may be shaped as a half of an oval or a semi-circle. In some embodiments, platform 202 may have multiple planes such that the platform curves upwards or downwards, in accordance with the contours of the surface of the aircraft. In some embodiments, platform 202 may be a single platform. In some embodiments, platform 202 may multiple platforms that may be arranged in a stacked, staggered, side-by-side, or any other suitable configuration. Platform 202 may be made of any suitable material, including metallic, nonmetallic or a combination thereof, for example, fiberglass, steel, and aluminum, and may be made of the same material as the cowling.

As shown in FIG. 2, platform 202 may include exhaust ducts 204, 206, 208, 210 and air ducts 214, 216, 218, 220 for directing exhaust paths from a system, or from multiple systems, and expelling the exhaust towards the rotor linkages. Air ducts on the exhaust manifold may be attached directly or indirectly to the corresponding system by any suitable structure, such as rigid plumbing, flexible hoses, accordion style ducts, among others, or a combination thereof. Air duct paths may be combined on the underside of platform 202 such that multiple air ducts flow into a single exhaust duct on the upper side of platform 202 (not shown). For example, air ducts 218, 220 may be combined to flow into a single exhaust duct (not shown).

An exhaust duct 204, 206, 208, 210 may be any suitable shape and size to effectively flow the system exhausts into the rotor linkages. Exhaust ducts may include features for directing exhaust in a direction, such as, towards the rotor discs rather than the rotors, which may be more affected by air temperature variations. In FIG. 2, for example, exhaust ducts 204, 206 are circular with a flange 205, 207 around the circumference that extends beyond the surface of platform 202 and angles towards the rotor disc. As shown in FIG. 2, the flange 205, 207 has a higher edge on the front side of the duct, which is away from the rotor disc and towards the front side of the aircraft 230, and a lower edge on the back side of the duct, which is towards the rotor disc and towards the back side of the aircraft 231, to direct the exhaust towards the rotor disc. Exhaust ducts may include other features for directing flow, such as, contouring along the inner sides, tapering of the air duct and/or exhaust duct, among others, or a combination thereof.

Air ducts and exhaust ducts may be attached to platform 202 using any suitable means, including adhesive, glue, and a metal holder with screws, among others, or a combination thereof. The interface between the duct and the platform may be sealed using any suitable sealing mechanisms, such as o-rings, adhesive, epoxy, and gaskets, among others, or a combination thereof, to prevent the exhaust from dissipating before flowing through the exhaust duct.

Exhaust manifold 200 may include mechanisms 222 for mechanically connecting platform 202 of the exhaust manifold to the rotorcraft, including attaching the platform to a cowl on the rotorcraft. These mechanisms may include, for example, screws, rivets, hasp clasps, compression latches, and draw latches, among others, or a combination thereof. Platform 202 may further include weather stripping or other material where the platform connects 222 to the rotorcraft for sealing and protecting against rust and other types of weather damage.

Figure 3:
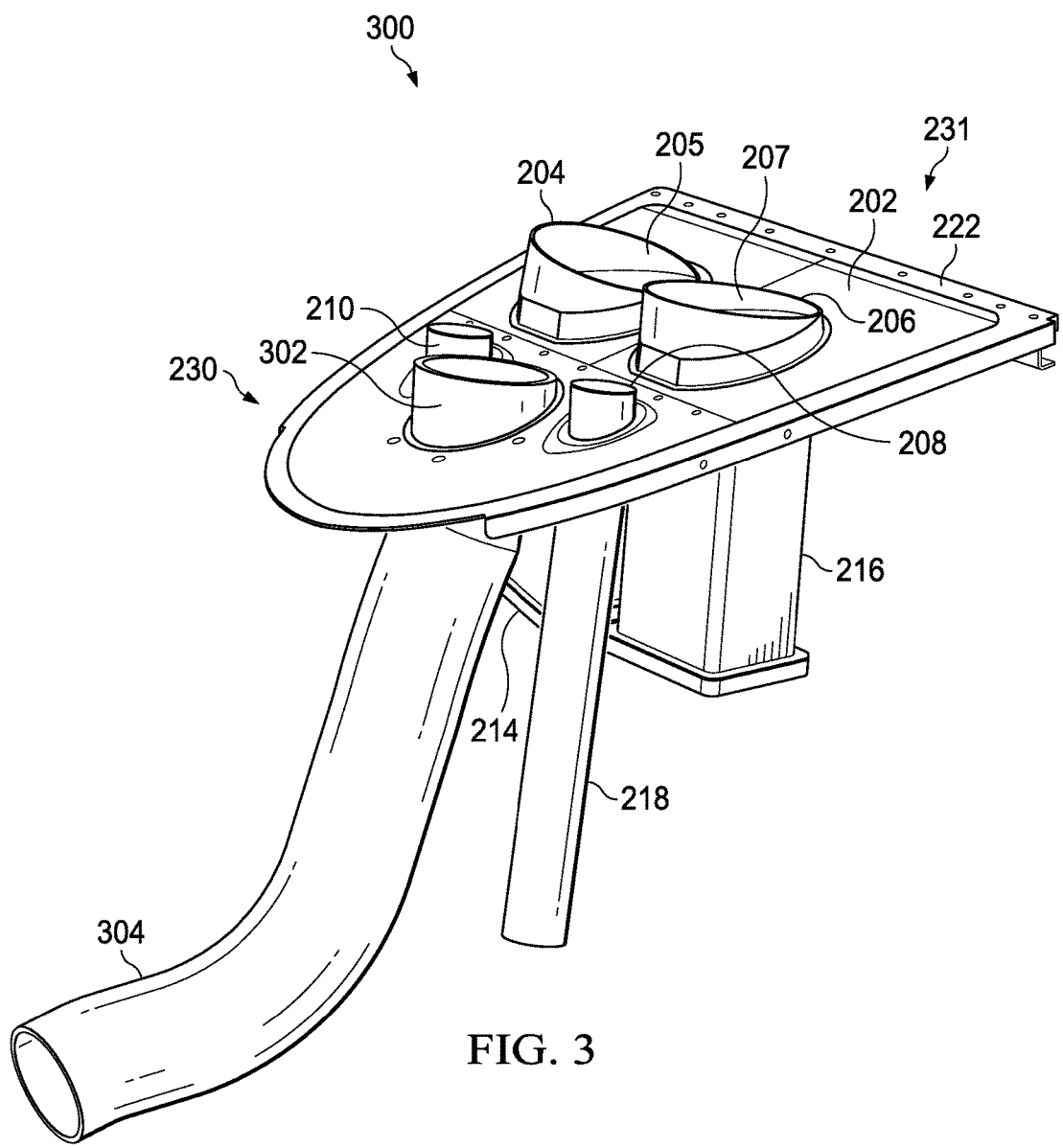
FIG. 3 illustrates another example exhaust manifold for combining system exhaust plume, in accordance with various embodiments.

FIG. 3 illustrates an exhaust manifold 300 for combining exhaust paths, in accordance with various embodiments. FIG. 3 is exhaust manifold 200 of FIG. 2 with additional exhaust duct 302 and air duct 304 for expelling exhaust from an environmental control system (ECS), which may control air temperature and air quality in a rotorcraft cabin. As depicted in FIG. 3, air duct 304 may receive exhaust from an ECS. The exhaust may flow through air duct 304, and may be expelled through exhaust duct 302 towards the rotor linkages. Although FIG. 2 depicts four exhausts and FIG. 3 depicts five exhausts, it will be understood that an exhaust manifold may include any number of air ducts and exhaust ducts, and may be configured to optimize the number and placement of ducts. In some embodiments, the size and shape of an air duct cross section is the same as the exhaust duct. For example, as shown for 302, 304 and 208, 218, the size and shape of the cross sections of the air duct and exhaust duct are the same, whereas as shown for ducts 204, 214 and 206, 216, the size and shape of the cross sections of the air duct and exhaust duct are different (i.e., circular as compared to square). The size and shape of the air duct and exhaust duct may be optimized, for example, based on the amount of exhaust received, the type of ducting used, and the method for moving the exhaust through the ducts.

Figure 4:
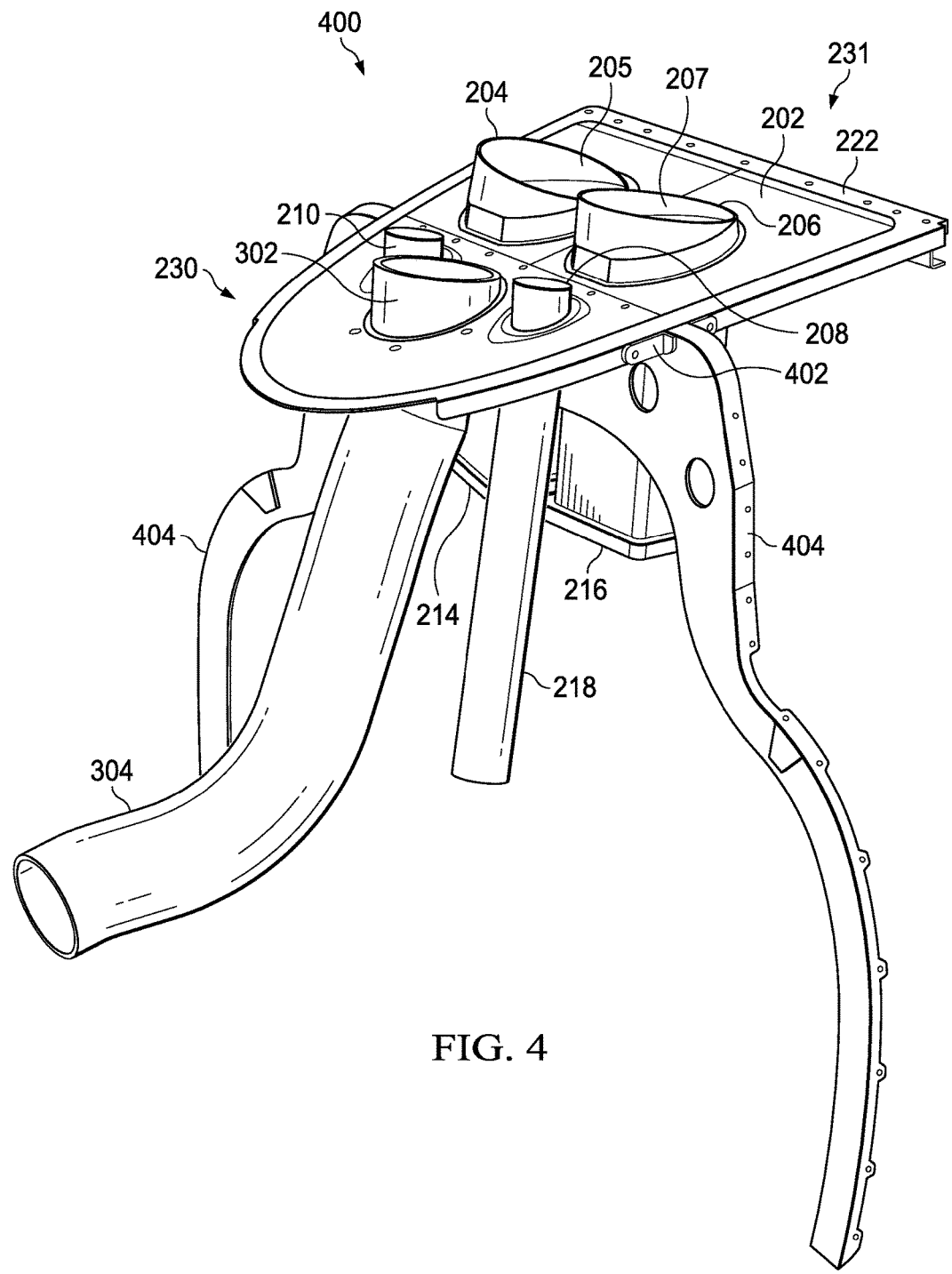
FIG. 4 illustrates an example exhaust manifold for combining system exhaust plume including support structure, in accordance with various embodiments.

FIG. 4 illustrates an exhaust manifold 400 for combining exhaust paths having a cowl support structure 404, in accordance with various embodiments. Cowl support structure 404 may be of any suitable size and shape to provide support to a cowl that overlays the structure. As depicted in FIG. 4, cowl support structure 404 may be a frame that attaches to one or more sides and/or the underside 402 of the exhaust manifold platform 202. Support structure 404 may be attached using any suitable means, such as screws, and snap fasteners, among others, or a combination thereof. Support structure 404 may be legs that extend from the underside of platform that are shaped to follow the contour of the cowl, such that the cowl lays along the entire support structure. In some embodiments, the support structure may be shaped to follow a portion of the contour of the cowl, such that the support structure supports a portion of the cowl. For example, a support structure may be shaped to follow a top portion of a contour of a cowl where a cowl may lay along only the top portion of the support structure and the legs may extend straight down rather than curving to match the full contour of the cowl. Cowl support structure 404 may be made of any suitable material, such as steel and hydroformed aluminum, among others, to provide support and stability to a cowl. Cowl support structure 404 may be attached to the floor of the equipment area where the exhaust manifold is located using any suitable means, such as screws and rivets, among others. In some embodiments, the cowl may not be attached to the support structure and may simply lay over the support structure. In some embodiments, the cowl may be attached to the support structure and may be attached using any suitable means, such as screws and rivets, among others, or a combination thereof.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An exhaust manifold for an aircraft comprising:
   a plurality of exhaust ducts in gaseous communication with one or more exhaust systems, wherein the exhaust ducts receive exhaust from the one or more exhaust systems; and
   a platform comprising the plurality of exhaust ducts, wherein the platform is located upstream of an equipment inlet, and wherein the plurality of exhaust ducts are configured to direct exhaust at a rotor linkage for the exhaust to dissipate away from one or more rotors attached to the rotor linkage.

2. The exhaust manifold of claim 1, wherein the one or more exhaust systems include one or more of a transmission, an oil cooling, a generator, and an environmental control system.

3. The exhaust manifold of claim 1, further comprising:
   a cowl, wherein the platform is attached to the cowl; and
   a cowl support structure, wherein the cowl support structure supports the cowl to which the platform is attached.

4. The exhaust manifold of claim 3, wherein the cowl support structure matches a contour of the cowl.

5. The exhaust manifold of claim 3, wherein the cowl support structure matches a portion of a contour of the cowl.

6. An apparatus, comprising:
- a plurality of exhaust ducts in gaseous communication with one or more exhaust systems, wherein the exhaust ducts receive exhaust from the one or more exhaust systems; and
- a platform comprising the plurality of exhaust ducts, wherein the platform is located upstream of an equipment inlet, and wherein the plurality of exhaust ducts direct exhaust at a rotor linkage for the exhaust to dissipate away from one or more rotors attached to the rotor linkage.

7. The apparatus of claim 6, wherein the one or more exhaust systems include one or more of a transmission, an oil cooling, a generator, and an environmental control system.

8. The apparatus of claim 6, further comprising:
- a cowl, wherein the platform is attached to the cowl; and
- a cowl support structure, wherein the cowl support structure supports the cowl to which the platform is attached.

9. The apparatus of claim 8, wherein the cowl support structure matches a contour of the cowl.

10. The apparatus of claim 8, wherein the cowl support structure matches a portion of a contour of the cowl.

11. A rotorcraft, comprising:
- an engine;
- an engine inlet;
- a rotor linkage; and
- an exhaust manifold comprising:
  - a plurality of exhaust ducts in gaseous communication with one or more exhaust systems, wherein the exhaust ducts receive exhaust from the one or more exhaust systems; and
  - a platform comprising the plurality of exhaust ducts, wherein the platform is located upstream of the engine inlet, and wherein the plurality of exhaust ducts are configured to direct exhaust at the rotor linkage for the exhaust to dissipate away from one or more rotors attached to the rotor linkage.

12. The rotorcraft of claim 11, wherein the one or more exhaust systems include one or more of a transmission, an oil cooling, a generator, and an environmental control system.

13. The rotorcraft of claim 11, further comprising:
- a cowl, wherein the platform is attached to the cowl; and
- a cowl support structure, wherein the cowl support structure supports the cowl to which the platform is attached.

14. The rotorcraft of claim 13, wherein the cowl support structure matches a contour of the cowl.

15. The rotorcraft of claim 13, wherein the cowl support structure matches a portion of a contour of the cowl.

* * * * *